(12) United States Patent
Arul

(10) Patent No.: US 11,400,848 B2
(45) Date of Patent: Aug. 2, 2022

(54) DUMP BODY FOR HAUL TRUCK

(71) Applicant: Caterpillar Inc., Peoria, IL (US)

(72) Inventor: Samuel J. Arul, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 16/945,819

(22) Filed: Aug. 1, 2020

(65) Prior Publication Data
US 2022/0032832 A1  Feb. 3, 2022

(51) Int. Cl.
  *B60P 1/28*  (2006.01)
(52) U.S. Cl.
  CPC ..................................... *B60P 1/28* (2013.01)
(58) Field of Classification Search
  CPC .. B60P 1/286; B60P 1/28; B60P 3/423; B60P 1/283; B60P 1/16; B60P 1/26; B60P 1/165; B60P 3/42; B60P 1/00
  USPC ..... 296/183.2, 183.1, 26.11, 186.4, 57.1, 66, 296/64, 24.43, 11; 298/17 R, 12 R, 1 R, 298/7, 18, 1 B, 1 H, 19 R, 23 D, 24, 23 R
  See application file for complete search history.

(56) References Cited

U.S. PATENT DOCUMENTS

| | | | | |
|---|---|---|---|---|
| 4,162,096 A | * | 7/1979 | Proeschl | B60P 1/286 296/193.04 |
| 5,887,914 A | * | 3/1999 | Hagenbuch | B60P 1/267 298/23 R |
| 6,022,068 A | | 2/2000 | D'Amico | |
| 6,481,785 B1 | * | 11/2002 | Coleman | B60P 1/286 296/183.2 |
| 6,565,146 B2 | * | 5/2003 | Fujan | B60P 1/283 296/183.2 |
| 6,568,744 B2 | | 5/2003 | Fujan et al. | |
| 6,592,172 B2 | | 7/2003 | Fujan et al. | |
| 6,754,945 B2 | | 6/2004 | Fujan | |
| 7,100,256 B2 | | 9/2006 | D'Amico et al. | |
| 9,272,652 B2 | | 3/2016 | Garcia-Huidobro Valdivieso | |
| 9,321,385 B2 | | 4/2016 | Annetts | |
| 2002/0180242 A1 | * | 12/2002 | Fujan | B60P 1/286 296/193.06 |
| 2014/0054925 A1 | | 2/2014 | Hyde et al. | |

FOREIGN PATENT DOCUMENTS

| | | |
|---|---|---|
| AU | 2018100452 A4 | 4/2018 |
| CN | 203920530 U | 11/2014 |
| WO | WO 2009/046488 A1 | 4/2009 |
| WO | 2013091007 W | 6/2013 |
| WO | WO 2019/200441 A1 | 10/2019 |

* cited by examiner

*Primary Examiner* — D Glenn Dayoan
*Assistant Examiner* — Sunsurraye Westbrook
(74) *Attorney, Agent, or Firm* — Xsensus LLC

(57) ABSTRACT

A dump body comprising a front wall, a canopy extending from the front wall in a first direction, and a bottom wall extending from the front wall in a second direction different from the first direction. The front wall, the canopy, and the bottom wall can form an interface configured to receive at least one pair of side walls. The bottom wall can have a convex shape in a transverse direction of the dump body and/or a longitudinal direction of the dump body. The bottom wall can be inclined according to one or more distinct angles from a front edge of the bottom wall to a rear edge of the bottom wall.

19 Claims, 13 Drawing Sheets

DUMP BODY FOR HAUL TRUCK

TECHNICAL FIELD

The present disclosure relates to haul trucks, and more particularly to dump bodies for haul trucks, and systems, arrangements, assemblies, and methods thereof.

BACKGROUND

Payload weight of a haul truck can be determined by Gross Vehicle Weight (GVW) of the haul truck. GVW can include weight of the chassis, dump body, and payload. On one hand, it may be desirable to reduce weight of the dump body to reduce weight of the haul truck and hence be able to accommodate greater payload. On the other hand, the dump body may need to withstand loads associated with the payload in addition to loads induced during operation of the haul truck. Conventionally, fabricated steel plates have been added to the bottom wall of the dump body to improve load and wear resistance of the bottom wall. However, adding such steel plates can disadvantageously increase the weight of the dump body. Moreover, such steel plates may not be provided according to a suitably efficient and effective arrangement.

A dump body may also become damaged should the tail or rear edge of the dump body be dragged through berm or otherwise contact a foreign object or material during a payload dumping operation. Conventionally, a dump body may be effectively shortened or its tail angle kicked up to increase tail ground clearance in an effort to prevent or minimize damage to the tail during the payload dumping operation. However, effectively shortening the dump body can reduce the overall volume of the dump body available for the payload or increase wear rate due to relatively sudden change in material flow angle caused by a relatively abrupt change in angle of the dump body.

Australian Patent Document AU 2018100452 ("the AU '452 patent document") describes a truck body structure that has a floor and a front wall connected by a curved section, along with floor side portions that angle upwards toward a rear of the body structure. According to the AU '452 patent document, a rearward portion of the body structure includes an upwardly inclined or increased upward angle to the rear portion/edge of the floor to decelerate material during unloading. However, the AU '452 patent document may be viewed as failing to describe clearly defined distinct changes in incline for the rearward portion of the of the body structure.

SUMMARY OF THE DISCLOSURE

In one aspect, a dump body is disclosed. The dump body can comprise a front wall; a canopy extending from the front wall in a first direction; and a bottom wall extending from the front wall in a second direction different from the first direction. The front wall, the canopy, and the bottom wall can form an interface configured to receive a plurality of different pairs of side walls with different heights. The bottom wall can have a convex shape in a transverse direction of the dump body. The bottom wall can include transition sections that run in a longitudinal direction of the dump body, each of the transition sections being coupled to a floor of the bottom wall, and each of the transition sections is convex. A middle portion of the floor of the bottom wall can form a thickest portion of the bottom wall.

In another aspect, a dump body for a haul truck is disclosed. The dump body can comprise a shell including a front wall, a canopy, and a bottom wall; and a pair of side walls spaced from each other in a transverse direction of the dump body and coupled to the shell, at least the side walls, the front wall, and the bottom wall defining a haul volume of the haul truck. The bottom wall can have a convex shape in a longitudinal direction of the dump body. The shell can form a modular interface configured to interface separately with a plurality of different side wall pairs having differing heights, including said pair of side walls. The bottom wall can include transition sections that run in the longitudinal direction of the dump body, each of the transition sections has a first edge coupled to a respective one of the side walls and a second edge coupled to a floor of the bottom wall, and each of the transition sections is convex from inside haul volume of the dump body.

And in yet another aspect, an off-highway rear haul truck is disclosed. The off-highway rear haul truck can comprise a frame; and a modular dump body configured to be operatively coupled to the frame. The modular dump body can include a front wall, a canopy extending forward from the front wall, a bottom wall having a convex shape in each of a transverse direction and a longitudinal direction of the modular dump body, and a pair of opposing side walls spaced from each other in the transverse direction of the dump body and coupled to each of the front wall, the canopy, and the bottom wall. The front wall, the canopy, and the bottom wall can form a modular interface configured to interface separately with a plurality of different opposing side wall pairs having differing heights, including said pair of side walls. The bottom wall can be stepped in the longitudinal direction of the dump body such that a rear edge of the bottom wall is at a height greater than a height at which a front edge of the bottom wall is to provide ground clearance for the bottom wall of the modular dump body when the modular dump body is in a fully raised position. A middle portion of the bottom wall can form a thickest portion of the bottom wall.

Other features and aspects of this disclosure will be apparent from the following description and the accompanying drawings.

DETAILED DESCRIPTION

Embodiments of the disclosed subject matter involve dump bodies for haul trucks, and systems, arrangements, assemblies, and methods thereof.

Figure 1:
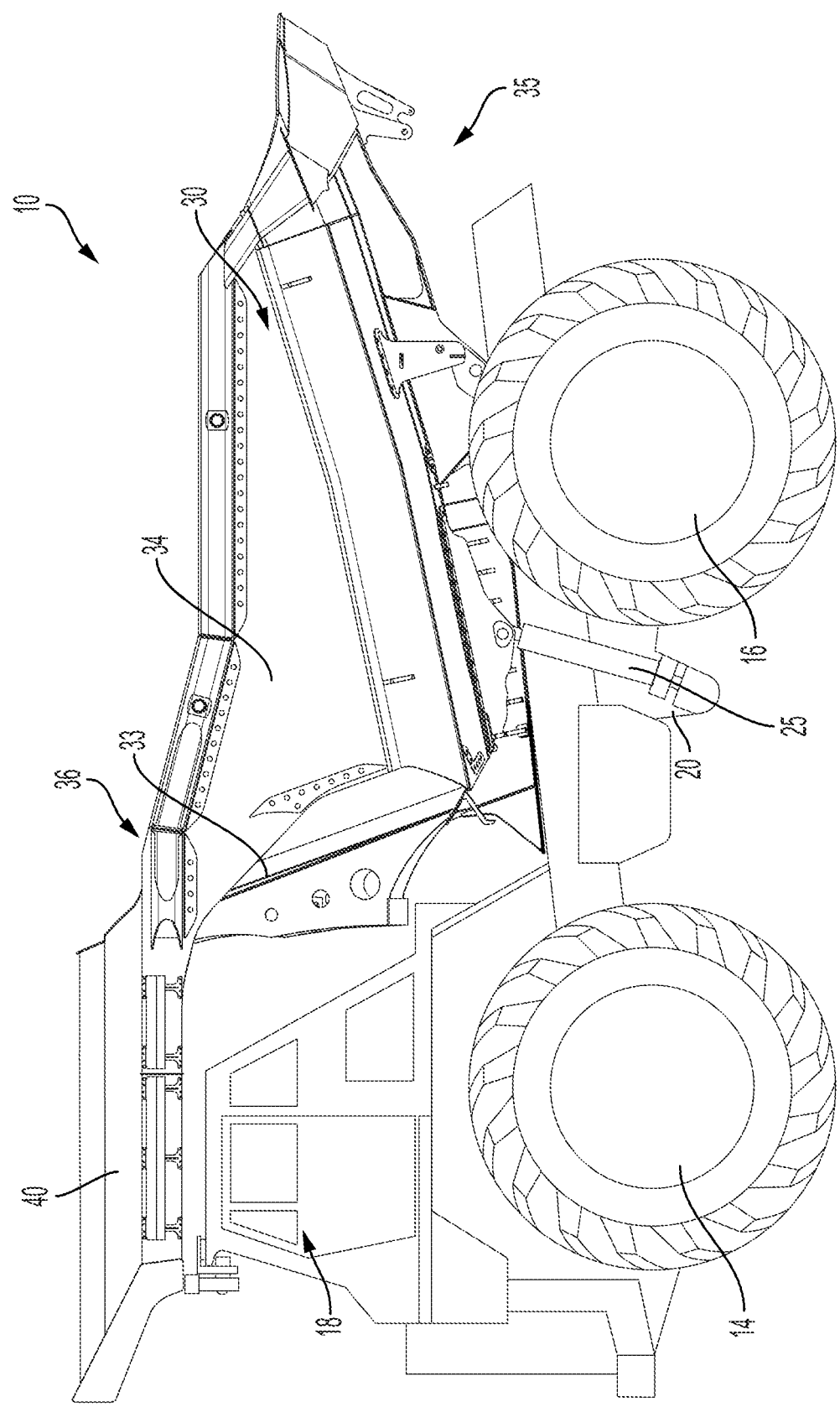
FIG. 1 is a side view of a truck according to embodiments of the disclosed subject matter.

Referring now to the drawings and with specific reference to FIG. 1, this figure illustrates an exemplary embodiment of a truck 10, according to one or more embodiments of the disclosure. Truck 10 may perform some type of operation associated with an industry such as mining, construction, or any other industry known in the art. For example, as shown in FIG. 1, truck 10 may be an earth moving machine, particularly, an off-highway rear haul truck 10.

Truck 10 may have a frame 20 supported by front wheels 14 and rear wheels 16 (including respective tires). The front and rear wheels 14, 16 may be connected to frame 20 by front suspension members and rear suspension systems, respectively (not expressly shown). Truck 10 may also include a bed or body 30 supported by the frame 20. Such bed or body 30 may be referred to herein as a dump body 30. The dump body 30 can be configured as a receptacle to receive hauling material or payload. Hence, an internal volume defined by the dump body 30 may be referred to as payload volume.

A rear portion 35 of the dump body 30 can be pivotably coupled or attached to a portion (including portions) of the frame 20 at a rear of the frame 20. Thus, the dump body 30 can be pivoted from a lowermost or rest position (i.e., not raised), such as shown in FIG. 1, to a raised position (e.g., fully raised). That is, the dump body 30 can be pivoted at the rear portion 35 of the frame 20 to raise or lower the portion of the dump body 30 in front of the pivot (and hence move the portion of the dump body 30 behind the pivot in the opposite direction). Such pivoting of the dump body 30 can be to raise a front portion 36 of the dump body 30 and lower the rear portion 35 of the dump body 30 to dump content or payload from within the dump body 30. Likewise, pivoting of the dump body 30 to lower the front portion 36 of the dump body 30 and raise the rear portion 35 of the dump body 30 to the rest position can be to receive content in the dump body 30. The pivoting can be performed using a pair of hoist members 25 (which may include cylinders) operatively coupled to the frame 20 and the dump body 30 (specifically hoist plates attached to the dump body 30).

Truck 10 may have an operator cabin 18 supported by the frame 20. Truck 10 may also be equipped with a steering mechanism and controls to move the truck 10 and controls to raise and lower dump body 30. The steering mechanism and the controls may be located within the operator cabin 18 of the truck 10.

The dump body 30 can also have a canopy 40. The canopy 40 can be fixedly coupled (e.g., welded) to a front wall 33 of the dump body 30 and front portions of opposing side walls 34 of the dump body 30. Thus, the canopy 40 can extend forward or in a longitudinal direction of the dump body 30 from a top portion of the front wall 33 and the opposing side walls 34 of the dump body 30. The canopy 40 can extend so as to at least cover the cabin 18.

Truck 10 may have a prime mover (not expressly shown) supported by the frame 20. The prime mover may be configured to propel the front and rear wheels 14, 16 in the forward or rearward direction. The prime mover may be lengthwise aligned on the frame 20 along a travel direction of the truck 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Figure 2:
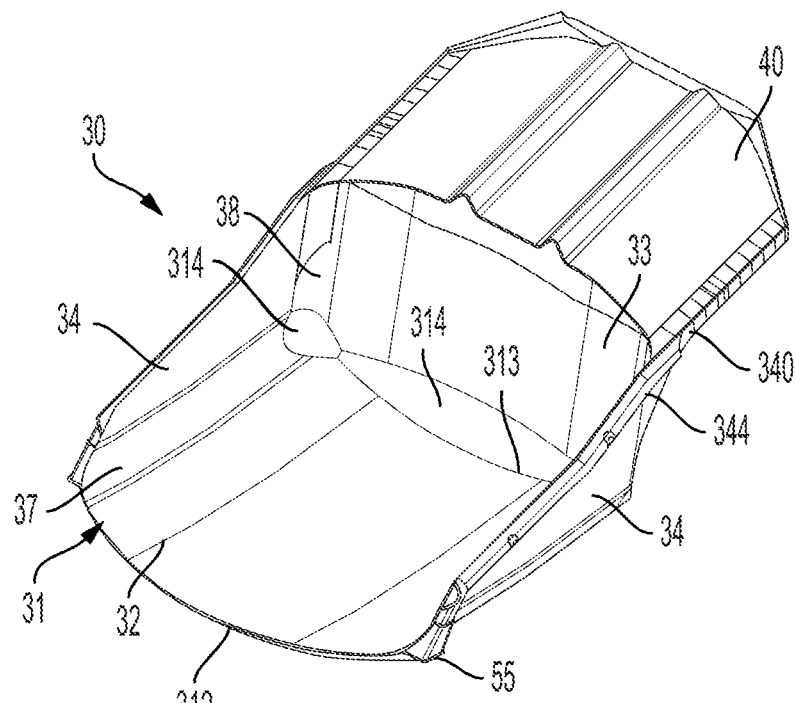
FIG. 2 is a top, rear perspective view of a dump body according to embodiments of the disclosed subject matter.
Figure 3:
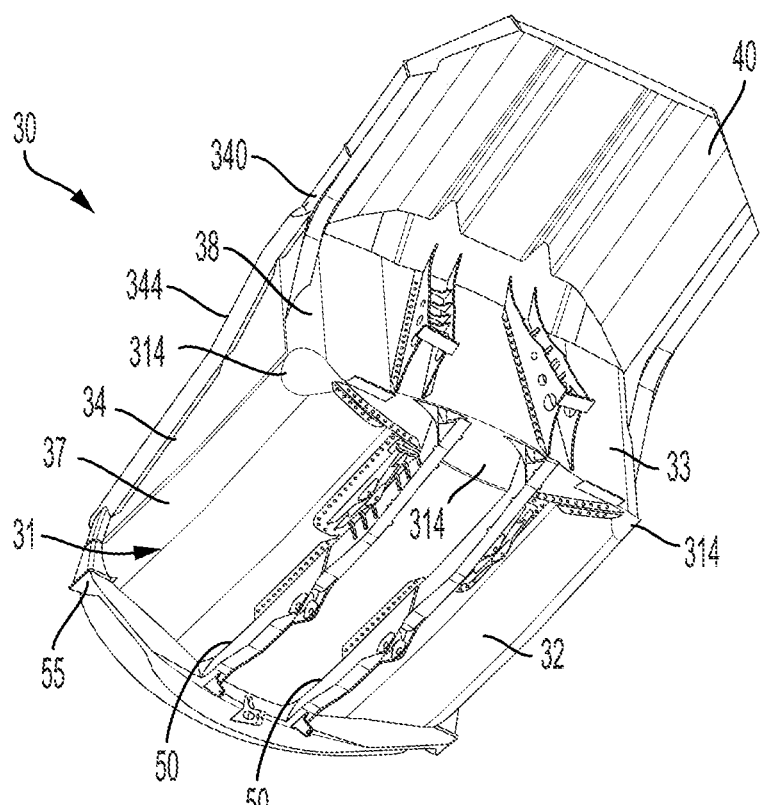
FIG. 3 is a bottom, front perspective view of the dump body of FIG. 2.

Turning to FIG. 2 and FIG. 3, which show a top, rear perspective view and a bottom, front perspective view, respectively, of the dump body 30, the side walls 34 can be coupled (e.g., welded) to a bottom wall 31 of the dump body 30 and the canopy 40 of the dump body 30. The side walls 34 can also be coupled (e.g., welded) to the front wall 33 either directly or indirectly, depending upon whether vertical transition sections 38 are considered part of the front wall 33.

Optionally, the side walls 34 can be removably coupled to the dump body 30 as part of the dump body 30. Thus, embodiments of the disclosed subject matter can be configured to accommodate, as part of the dump body 30, multiple different side walls 34 (e.g., different pairs of side walls). Such different side walls may have different heights, for instance, and, as such, can provide for multiple different payload volumes for the dump body 30. Hence, the bottom wall 31, the canopy 40, and the front wall 33 (including intervening support structures, such as transition sections) can be characterized as forming a modular interface by which different side walls, such as the side walls 34, can be implemented as part of the dump body 30. Put another way, the bottom wall 31, the canopy 40, and the front wall 33 can form a shell for the dump body 30, wherein opposing side walls (e.g., side walls 34), can be chosen for the dump body 30 according to a particular requirement or requirements, such as GVW, payload volume and angle of repose, weight of the chassis of the truck 10, or weight of the dump body 30.

The bottom wall 31, which can extend rearward from the front wall 33, can have a convex shape in the transverse direction of the dump body 30. That is, as shown in FIG. 2, for instance, the bottom wall 31 may be convex from one side edge to the other side edge. Optionally, the nature of the convexity in the transverse direction can be linear, according to a smooth or gradual curvature (as opposed to stepped, for instance). One or more longitudinal support structures 50 may be provided on an underside of the dump body 30, on the underside of the bottom wall 31, such as shown in FIG.

3. Optionally, a transverse support structure 55 may also be provided at least partially on the underside of the dump body 30, at a rear edge of the dump body 30, such as shown in FIG. 3.

Figure 5:
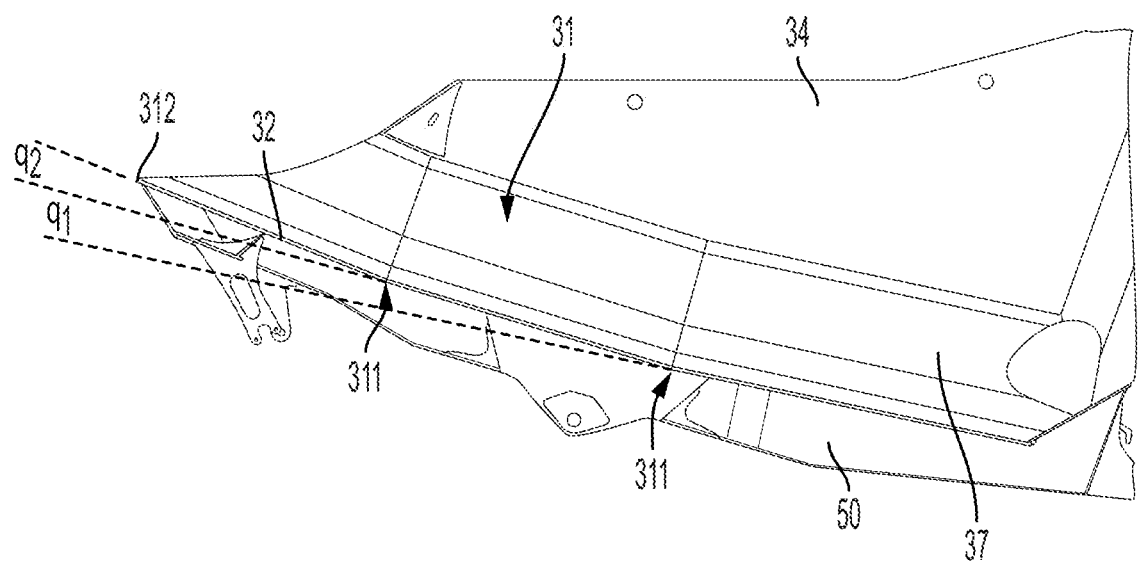
FIG. 5 is a side sectional view of a portion of the dump body of FIG. 2.

As shown in FIG. 5, the bottom wall 31, including a floor 32 thereof, can be convex in shape in the longitudinal direction of the dump body 30. According to one or more embodiments, the bottom wall 31, including the floor 32 thereof, can be stepped in the longitudinal direction of the dump body 30. The stepping can be such that a rear edge or tail 312 of the bottom wall 31 (including the floor 32) is at a height greater than a height at which a front edge 313 of the bottom wall 31 or floor 32 is to provide ground clearance for the bottom wall of the dump body 30 when the dump body 30 is fully raised. Incidentally, one or more interface support structures 314 may be provided at the front edge 313 of the bottom wall 31, and may be considered part of the bottom wall 31. Hence, the front edge 313 of the bottom wall 31 may, according to one or more embodiments, be defined according to the front edge(s) of the one or more optional interface support structures 314.

FIG. 5, for instance, shows two distinct steps or kick-ups 311, though embodiments of the disclosed subject matter may have more than two kick-ups 311, such as three kick-ups 311. Each kick-up 311 can increase the angle of the bottom wall 31, or just a portion thereof (e.g., floor 32) by a predetermined amount. For instance, a first kick-up 311 may increase the angle of the floor 32 by an amount θ1, and a second kick-up 311 may increase the angle of the floor 32 by an amount θ2. The amount θ1 may or may not equal the amount θ2. The overall angle of the floor 32 at the tail or rear edge 312 of the bottom wall 31 may be relative to horizontal.

According to one or more embodiments, the total amount by which the steps increase the angle of the bottom wall 31, or just a portion thereof (e.g., floor 32), may be ten degrees. Thus, as but one example, the increase may be evenly split among θ1 and θ2, meaning each kick-up 311 transition increases the angle by four to five degrees. As a non-limiting example, the kick-ups 311 may increase the angle from twelve degrees to either twenty degrees or twenty-two degrees. According to one or more embodiments, longitudinal lengths of portions of the floor 32 after the kick-up 311 may be different or the same. For instance, FIG. 5 shows the distance between the kick-ups 311 being greater than the distance from the last kick-up 311 and the tail or rear edge of the floor 32.

In addition to the floor 32, the bottom wall 31 may also have transition sections 37 at opposite sides of the floor 32. The transition sections 37 can run in the longitudinal direction of the dump body 30, from the tail or rear edge 312 of the bottom wall 31 to the front edge 313 of the bottom wall 31. Each transition section 37 can be coupled (e.g., welded) to respective ones of the side walls 34. Hence, the transition sections 37, which may be separate sections relative to the floor 32, can be provided between the floor 32 and the side walls 34. In this regard, the transition section 37 may have an upright portion and a laterally inward portion, the upright portion leading to the side wall 34 and the laterally inward portion leading to the floor 32.

Figure 17A:
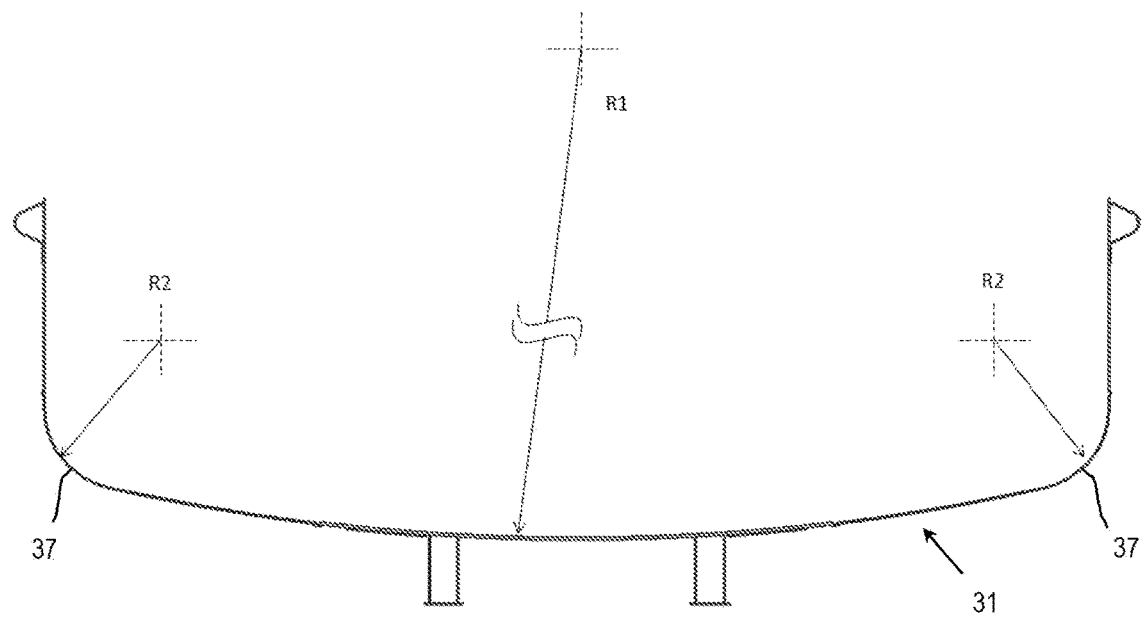
FIG. 17A is a sectional view of the bottom wall of the dump body associated with line 17A-17A' in FIG. 6.

According to one or more embodiments, the transition sections 37, themselves, may be convex. That is, the transition sections 37, according to one or more embodiments, may have a convex shape that, though of the same orientation, can be different from the convex shape of the floor 32 of the bottom wall 31. Referring to FIG. 17A, which shows a cross-sectional view of the bottom wall 31 based on line 17A-17A' in FIG. 6, the bottom wall 31 may have a curvature having a radius of at or about R1 and the transition sections 37 may have a curvature having a radius of at or about R2, wherein R1 can be different than R2 in value. As non-limiting examples, R1 may be 15,000+/−25 mm and/or R2 may be 600+/−25 mm.

The side walls 34 can extend from respective transition sections 37 of the bottom wall 31. For instance, the side walls 34 can be fixedly coupled (e.g., welded) to the transition sections 37 and may extend vertical or substantially vertical. Optionally, the side walls 34 can have a rail 344. More specifically, the rail 344 may form a top rail of the side walls 34 and, hence the dump body 30.

Figure 6:
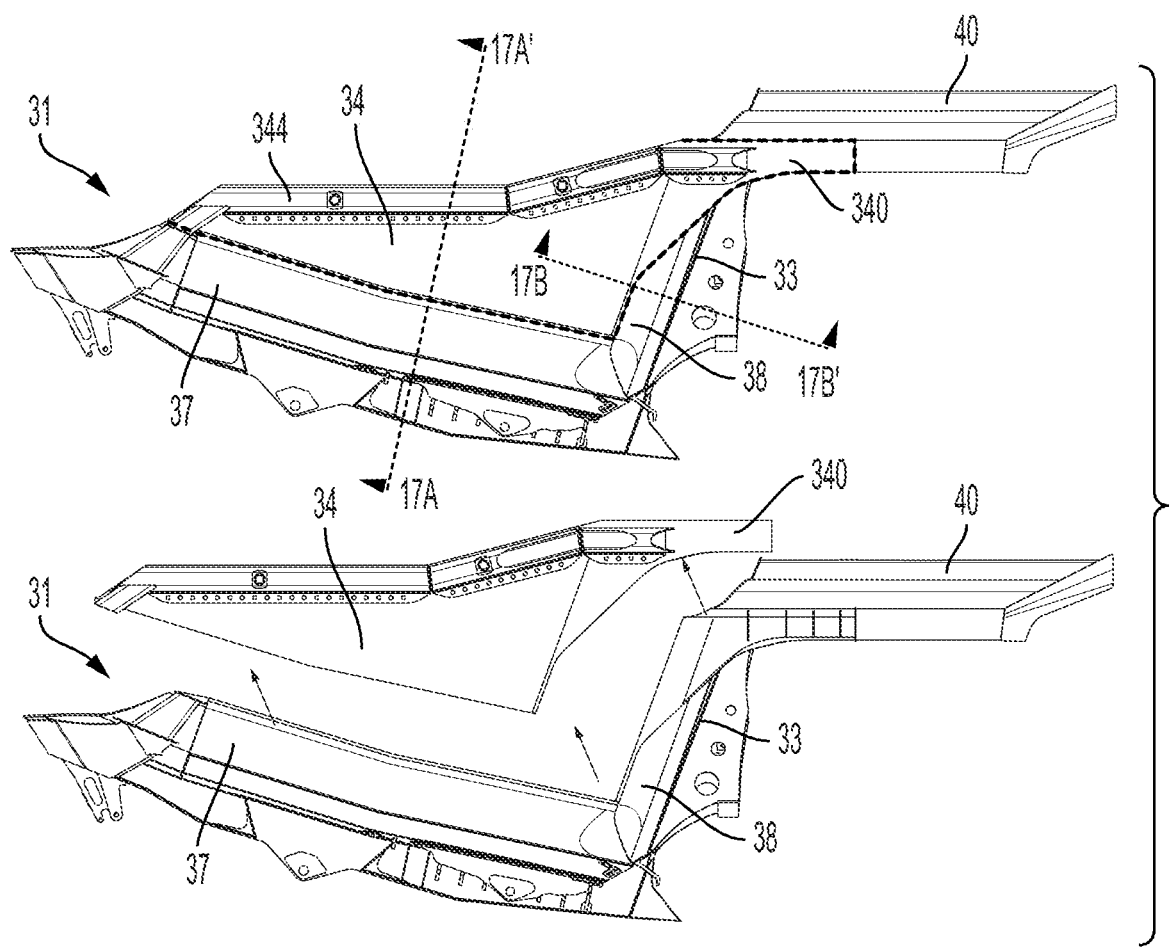
FIG. 6 shows assembled and disassembled views of a dump body according to embodiments of the disclosed subject matter.

Additionally, each side wall 34 can have a forward support structure 340. The forward support structure 340 can be in the form of a projection and can be configured to interface with the canopy 40. More specifically, the forward support structure 340 of each of the side walls 34 can be coupled (e.g., welded) to the canopy 40. Optionally, the forward support structure 340 may not extend to a front edge of the canopy 40. That is, according to one or more embodiments, the forward support structure 340 may extend only partway along a length of the canopy 40, such as shown in FIG. 6, and may interface with an edge support structure of the canopy 40. In that the forward support structure 340 may extend only partway along the length of the canopy 40, the rail 344 of the side wall 34 may also not extend the entire length of the canopy 40.

Figure 4:
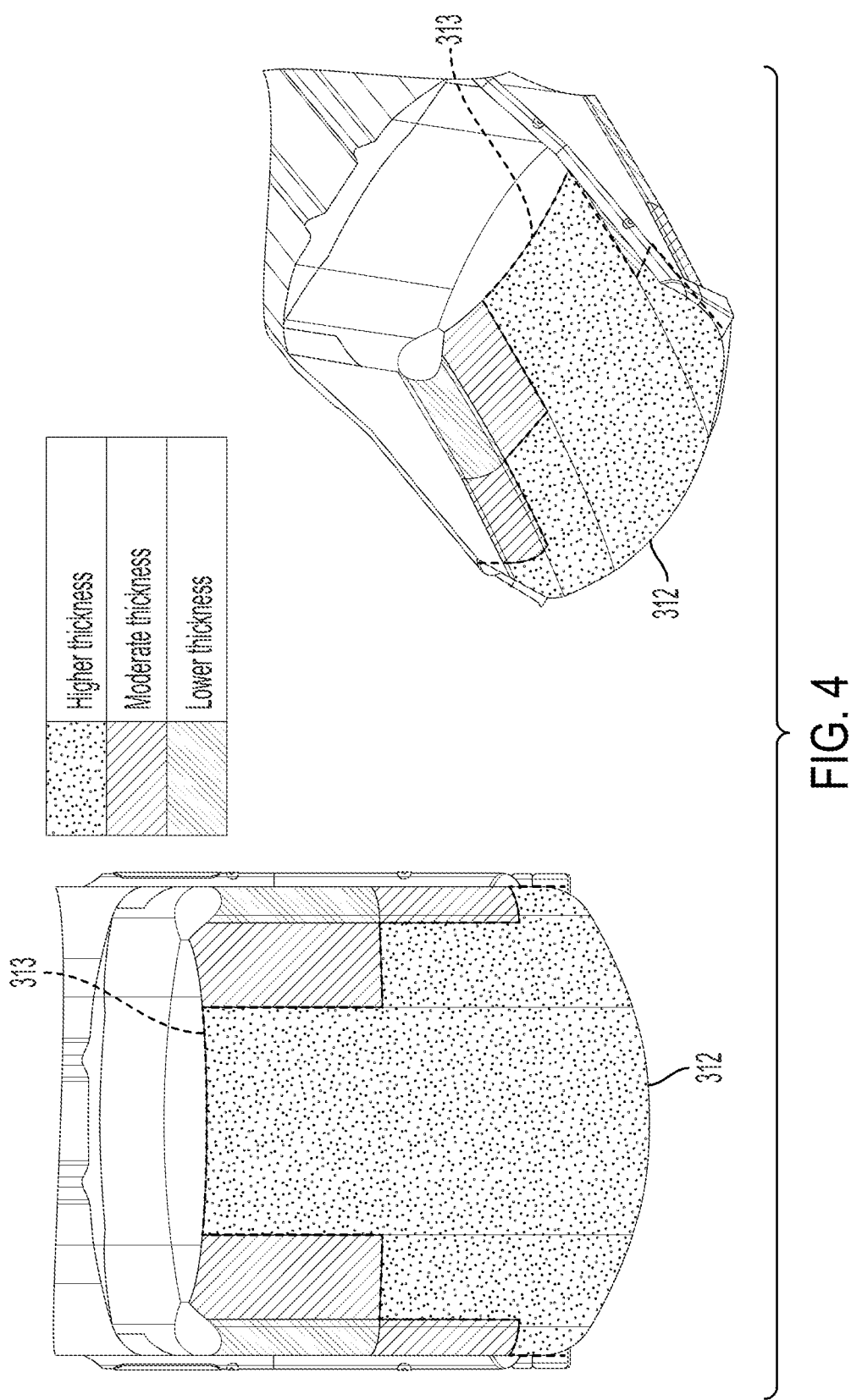
FIG. 4 show different thicknesses for a bottom wall of a dump body according to embodiments of the disclosed subject matter.

Turning to FIG. 4, the bottom wall 31, which may be thicker than the side walls 34 and/or the front wall 33, may have sections with different thicknesses. As shown, a middle portion of the bottom wall 31 may form the thickest portion of the bottom wall 31. According to one or more embodiments, the thickest portion may be provided along a longitudinal center line of the bottom wall 31, for instance, extending from the front edge 313 of the bottom wall 31 to the rear edge or tail 312 of the bottom wall 31, such as shown in FIG. 4. That is, the middle portion may be defined along the longitudinal center line of the bottom wall 31. The middle portion may also be defined transversely, meaning that the thickest portion may be at a transverse center line of the bottom wall 31.

According to one or more embodiments, the thickest portion of the bottom wall 31 may be in the shape of a bell, in an overhead plan view of the bottom wall 31, such as shown in FIG. 4. The bell shape, which may be referred to as a rough bell shape, can be derived from wear data specific to a work site or line of trucks or more generally across multiple work sites and trucks. For instance, impact and wear may be found to be more severe at a center portion of the bottom wall 31 and loads may be highest at the center and toward the rear of the bottom wall 31, as compared to the sides of the bottom wall 31. Hence, the shape of the thicknesses may be set according to the impact, wear, and load data to optimize the arrangement of the different thicknesses.

As shown, the base of the bell shape, which again can represent the thickest portions of the bottom wall 31, can extend along the entire rear edge or tail 312 of the bottom wall 31. The middle of the bell shape may be in the center of the bottom wall 31, as discussed above, with medium or moderate thickness on the sides, at the transition sections 37. The head of the bell shape may, again, be provided along the longitudinal center line of the bottom wall 31, with the thickness tapering in reduced thickness transversely outward to the transition sections 37, from thickest at the head of the bell shape to a medium or moderate thickness, then to a lowest thickness at the transition sections 37. According to one or more embodiments, the thickest portion of the bottom wall 31 may be according to a factor of 1, the medium or moderate thickness may be according to a factor of ¾, and the lowest thickness may be according to a factor of ½.

Figure 7:
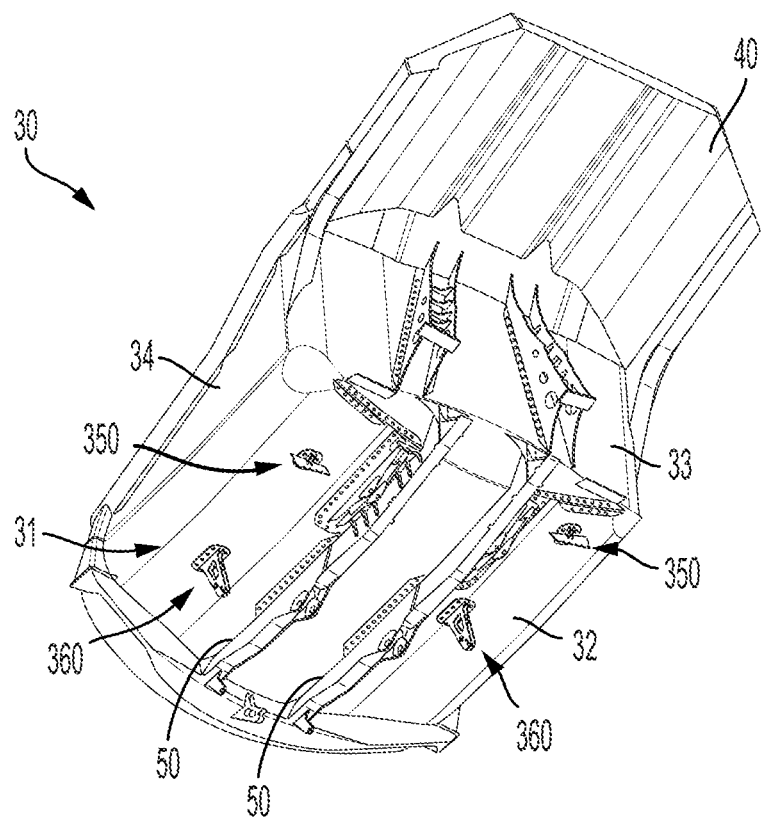
FIG. 7 is a bottom, front perspective view of a dump body according to embodiments of the disclosed subject matter.

Turning now to FIG. 7, FIG. 7 is a bottom, front perspective view of a dump body 30 according to embodiments of the disclosed subject matter. Dump body 30 is similar to dump body 30 of FIG. 3, but notably includes one or more first body attachments 350 and one or more second body attachments 360. Each of the first body attachments 350 may be referred to as a mudflap attachment, and each of the second body attachments 360 may be referred to as a rock ejector attachment. Though FIG. 7 shows both the first body attachments 350 and the second body attachments 360, alternatively, either only first body attachments 350 or only second body attachments 360 may be provided.

Figure 8:
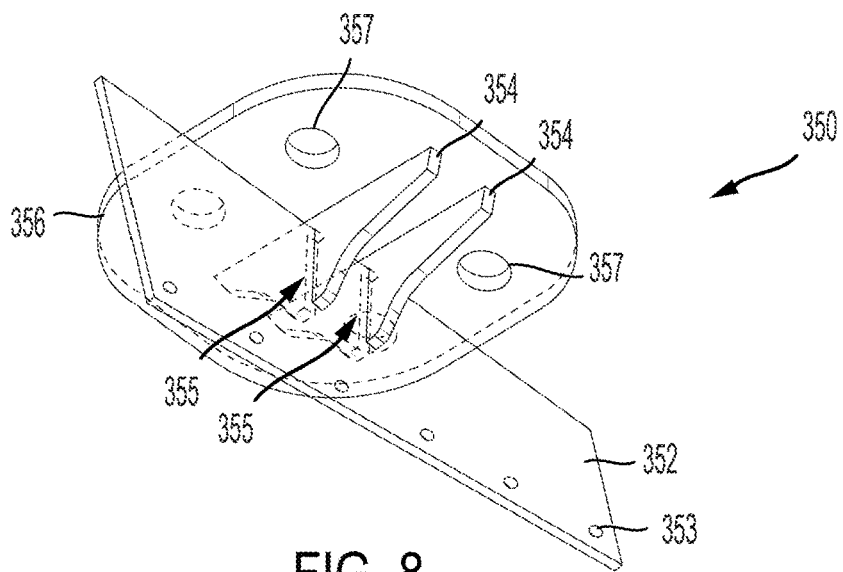
FIG. 8 is a perspective view of a body attachment according to embodiments of the disclosed subject matter.

Referring now to FIG. 8, the first body attachment 350 can have a transverse or attachment bracket plate 352, one or more longitudinal plates 354, and a base or board plate 356. Optionally, the transverse plate 352 may be referred to as a mud-flap mounting plate, because a rubber flap can be mounted thereto.

Figure 9:
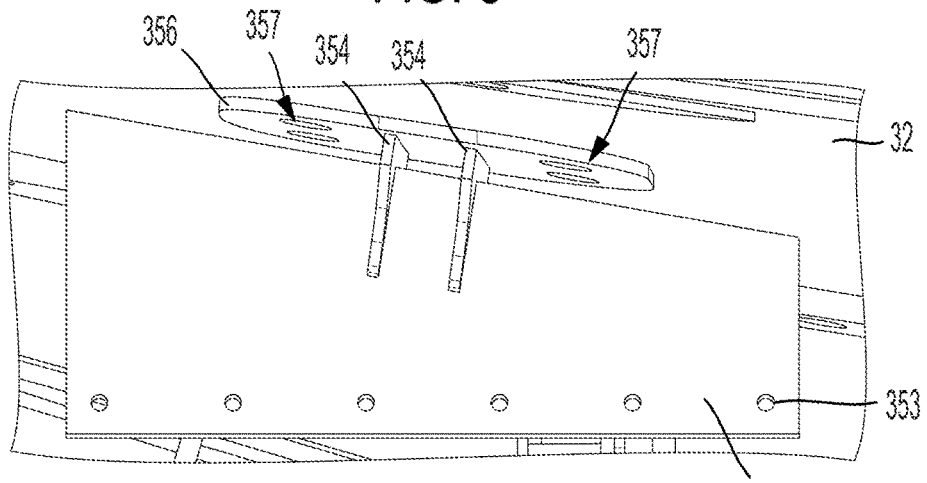
FIG. 9 is a side view of the body attachment of FIG. 8 on the dump body of FIG. 7.
Figure 10:
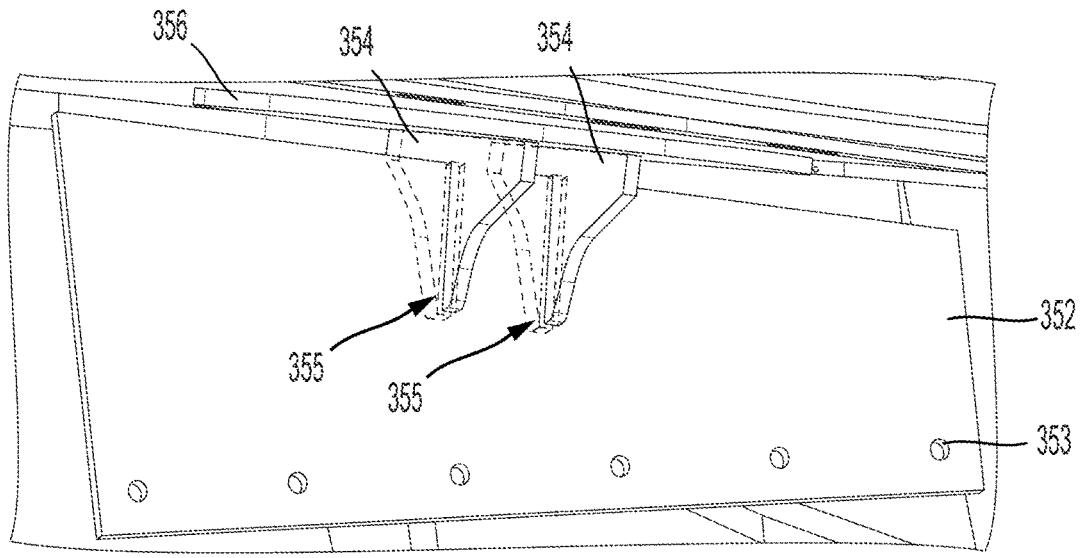
FIG. 10 is s side transparent view of the body attachment of FIG. 8 on the dump body of FIG. 7.

The transverse plate 352 can be sized and/or shaped to meet the requirements of the truck 10 and the dump body 30. For example, size of the transverse plate 352 may be set by mud coverage/protection required for other components of the truck 10 or dump body 30. As but one example, the transverse plate 352 can have a length greater than a width, and may be in the form of a polygon, for instance, with at least two parallel edges. Optionally, the transverse plate 352 may have a width that tapers along a length direction of the transverse plate 352, such as shown in FIG. 9 and FIG. 10. Such tapering can be based on the longitudinal curvature of the floor 32 of the bottom wall 31 of the dump body 30.

According to one or more embodiments, the transverse plate 352 can have a plurality of fastener slots 353. The fastener slots 353 can provide a connection interface between the transverse plate 352 and a corresponding mud flap (not shown). The mud flap can be attached to the transverse plate 352 via fasteners (e.g., bolts) provided through the fastener slots 353.

Each of the one or more longitudinal plates 354 can have a body with a slot 355. The slot 355 can be sized to receive respective a portion of the transverse plate 352, such as shown in FIGS. 8-10. Optionally, in the case of multiple longitudinal plates 354, some, none, or all of the longitudinal plates 354 may run or extend parallel to each other.

The base plate 356 can have one or more weld slots 357. FIG. 8, for instance, shows base plate 356 having four weld slots 357. Optionally, the base plate 356 can have rounded corners, such as shown in FIG. 8, and may have a length greater than a length of the longitudinal plates 354, but less than a length of the transverse plate 352.

The transverse plate 352 can be provided in the slots 355 of the longitudinal plates 354 and attached (e.g., welded) to the longitudinal plates 354 at the slots 355. Alternatively, slots can be provided in the transverse plate 352 to receive the longitudinal plates 354. As yet another alternative, neither the transverse plate 352 nor the longitudinal plates 354 can have slots, and the shape of the transverse plate 352 can be such that the transverse plate 352 is welded directly to each of the longitudinal plates 354 without the use of slots.

The attachment of the transverse plate 352 to the longitudinal plates 354 may be done prior to the longitudinal plates 354 being fixed (e.g., welded) to the base plate 356. In any event, each of the longitudinal plates 354 can be, at a side thereof (e.g., a base thereof) opposite the slot 355, attached (e.g., welded) to the base plate 356. Optionally, such attachment may be done prior to the base plate 356 being fixed (e.g., welded) to the floor 32 of the bottom wall 31.

The base plate 356 can be fixed (e.g., welded) to the floor 32 of the bottom wall 31. In particular, the base plate 356 can be fixed (e.g., welded) to the floor 32 such that the outer perimeter of the base plate 356 is not welded to the floor 32 and around the weld slots 357 is the only portions where the base plate 356 is fixed (e.g., welded) to the floor 32. Hence, the outer perimeter of the base plate 356 may be in contact with the floor 32, but can be free of weldment, thereby making metal-on-metal (e.g., steel-on-steel) contact with the floor 32.

Each of the first body attachments 350 can be fixed (e.g., welded) to the floor 32 of the bottom wall 31 such that the base plate 356 is in direct contact with the floor 32 at least at the outer perimeter of the base plate 356 and the base plate 356 is fixed (e.g., welded) only at the weld slots 357, as noted above. When fixedly attached to the floor 32, the transverse plate 352 can be oriented transverse, substantially transverse, or generally transverse to a longitudinal or length direction of the dump body 30. Also, when fixedly attached to the floor 32, the longitudinal plates 354 can be oriented along, substantially along, or generally along the longitudinal or length direction of the dump body 30.

Figure 11:
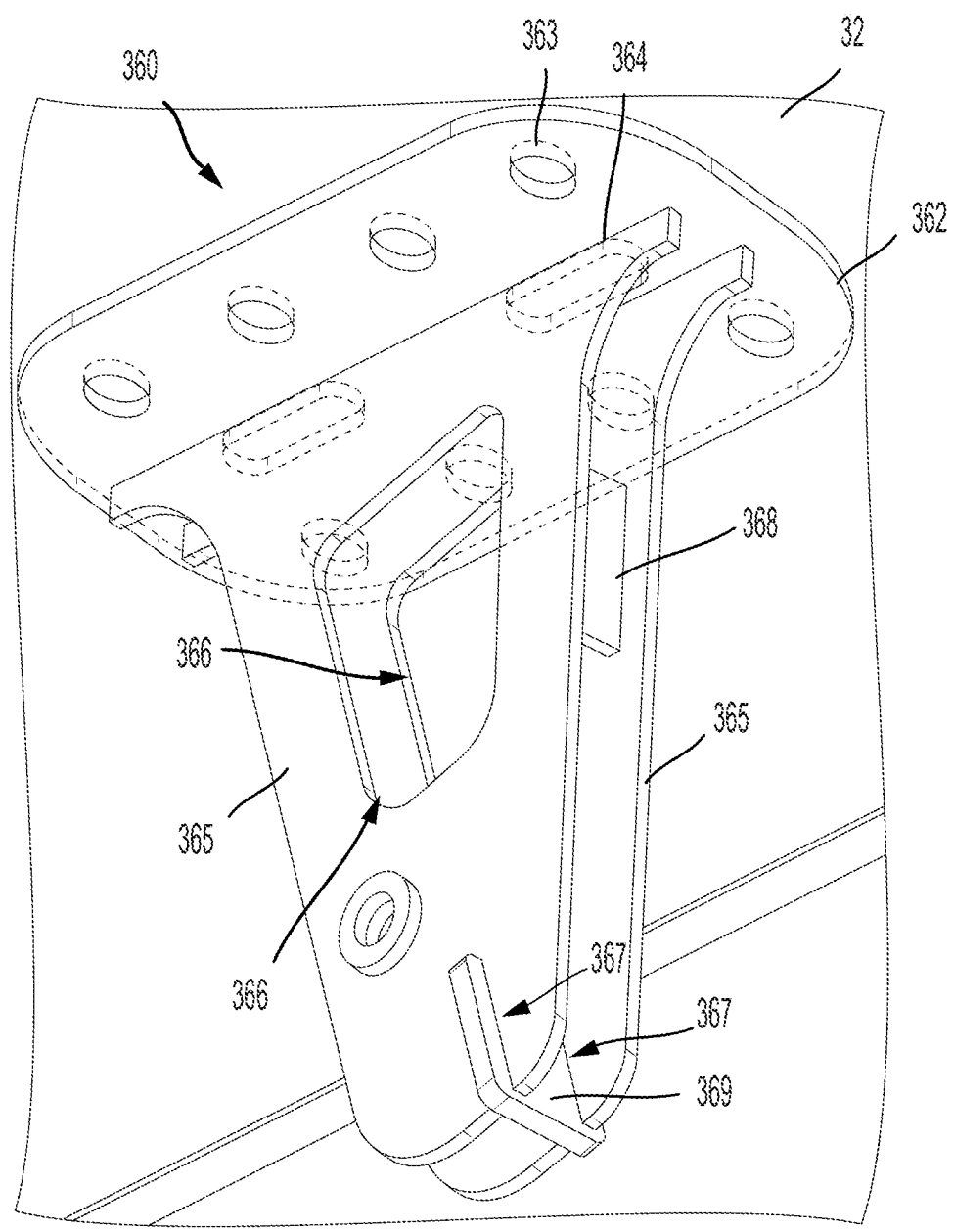
FIG. 11 is a perspective transparent view of a body attachment according to embodiments of the disclosed subject matter.

FIG. 11 is a perspective transparent view of the second body attachment 360. As noted above, the second body attachment 360 may be referred to as a rock ejector attachment.

The second body attachment 360 can have a base or board plate 362, a pair of longitudinal plates 365, and one or more transverse plates 368, 369. The longitudinal plates 365, which may have a height greater than a length of the base plate 362, can extend from the base plate 362. According to one or more embodiments, the longitudinal plates 365 can be parallel to each other, for instance. Optionally, each of the longitudinal plates 365 can have at least one cutout 366. Each at least one first transverse plate 368 may be provided between the longitudinal plates 365, such as shown in FIG. 11. The second transverse plate 369 may span the longitudinal plates 365, and may be provided in respective slots 367 of the longitudinal plates 365. Optionally, one or more edges of the second transverse plate 369 may extend from the sides and/or edges of the longitudinal plates 365.

The base plate 362 can have one or more first weld slots 363. FIG. 11, for instance, shows base plate 362 having eight first weld slots 363, four on each side of the pair of longitudinal plates 365. According to one or more embodiments, the base plate 362 can have one or more second weld slots 364, which may be elongate, provided between the longitudinal plates 365. Optionally, the base plate 362 can have rounded corners, such as shown in FIG. 11, and may have a length greater than a width.

Each of the longitudinal plates 365 can be attached (e.g., welded) to the base plate 362 at an end portion thereof (e.g., a base thereof) opposite the slot 367. Optionally, such attachment may be done prior to the base plate 362 being fixed (e.g., welded) to the floor 32 of the bottom wall 31. The base plate 362 can be fixed (e.g., welded) to the floor 32 of the bottom wall 31. In particular, the base plate 362 can be fixed (e.g., welded) to the floor 32 such that the outer perimeter of the base plate 362 is not welded to the floor 32 and, instead, is welded around the first weld slots 363. Hence, the outer perimeter of the base plate 362 may be in contact with the floor 32, but can be free of weldment, thereby making metal-on-metal (e.g., steel-on-steel) contact with the floor 32. Optionally, the base plate 362 may also be fixed (e.g., welded) to the floor 32 around the second weld slots 364. When fixedly attached to the floor 32, the longitudinal plates 365 can be oriented along, substantially along, or generally along the longitudinal or length direction of the dump body 30.

Referring again to FIG. 4, the bottom wall 31 may have portions of different thicknesses. Moreover, such portions may be in the form of different plates having different thicknesses, which can be affixed (e.g., welded) to each other to create the overall bottom wall 31. Where portions (e.g., plates) having different thicknesses connect may be referred to as unions or interfaces.

Figure 12:
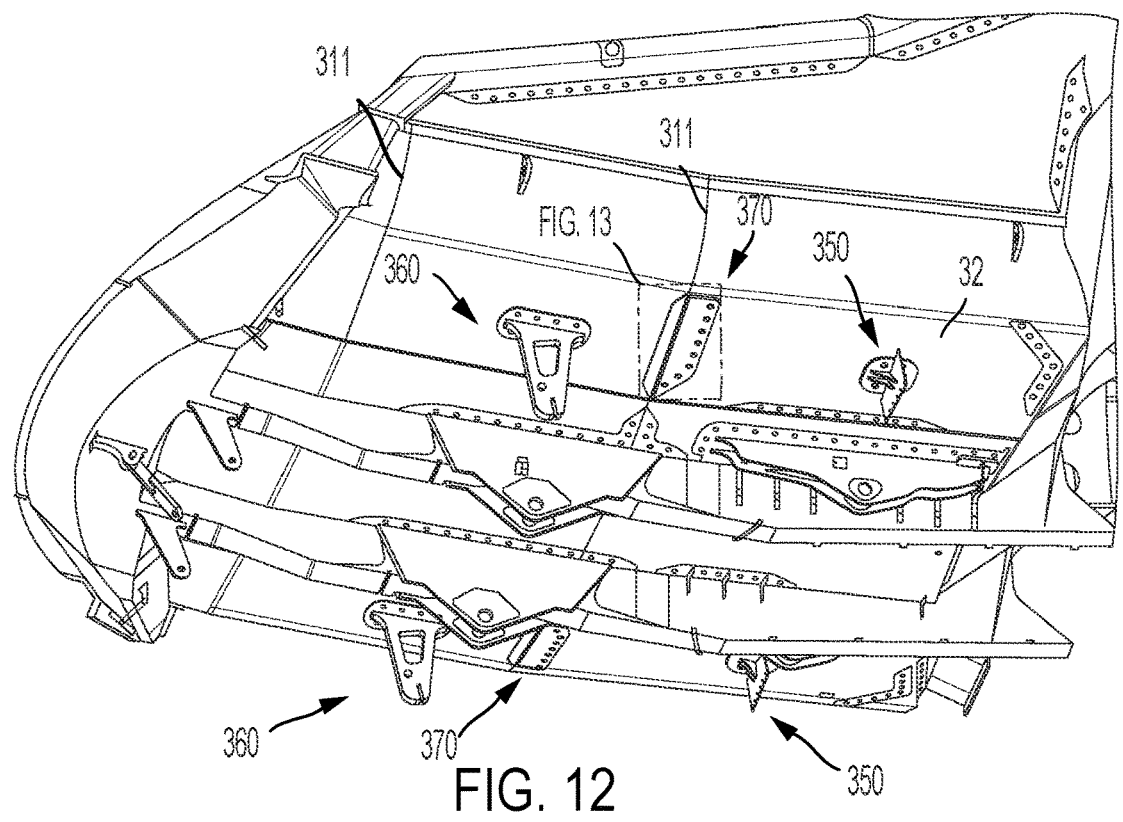
FIG. 12 is a bottom, side view of the dump body of FIG. 7.
Figure 14:
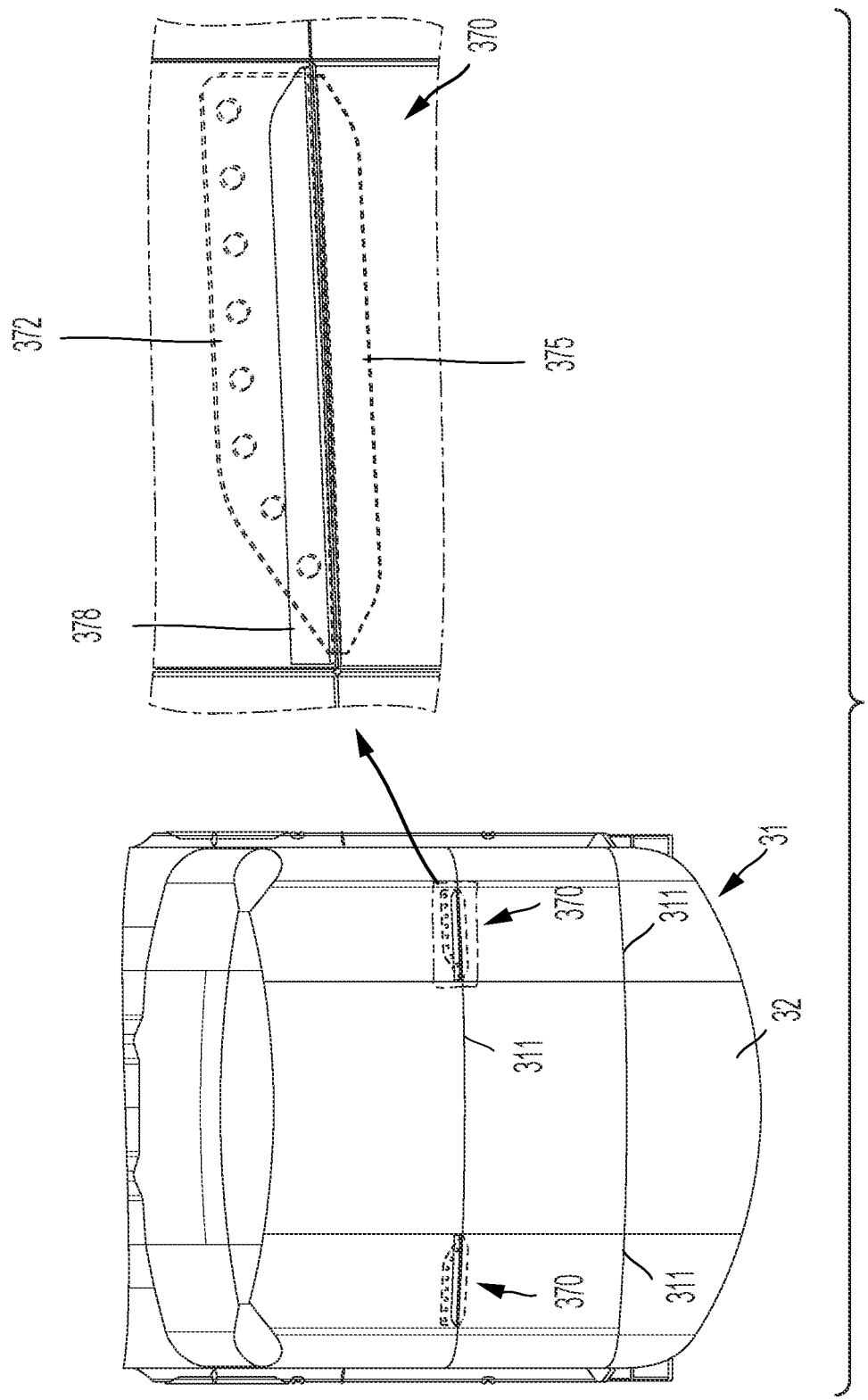
FIG. 14 shows views of the support structure of FIG. 13 from an overhead view of a dump body according to embodiments of the disclosed subject matter.

As shown in FIG. 12 and FIG. 14, according to one or more embodiments, the bottom wall 31, for instance, the floor 32 thereof, can have one or more support structures 370 (FIG. 12 and FIG. 14 show a pair of support structures 370). The support structure 370 can be provided at a union of a moderate thickness portion (e.g., plate) of the floor 32 and a thickest portion of the floor 32.

The support structure 370 can include a set of one or more support plates, each of which may be referred to as doublers, coupled (e.g., welded) to the floor 32 of the bottom wall 31. For example, the support structure 370 can include a first support plate 372, a second support plate 375, and a third support plate 378. As shown in FIG. 12 and FIG. 14, for instance, the first support plate 372 and the second support plate 375 can be coupled (e.g., welded) to a bottom side of the floor 32, and the third support plate 378 can be coupled (e.g., welded) to a top side of the floor 32 opposite the bottom side. Optionally, the first support plate 372 can have a plurality of weld slots 373 and the second support plate 375 and the third support plate 378 may be free of weld slots.

First support plate 372 and second support plate 375 can be fixed (e.g., welded) to each other at the union of moderate thickness plate and higher thickness plate on the bottom side of the floor 32. Optionally, weld slots (openings) can be provided also for the second support plate 375 and the third support plate 378, through which the second support plate 375 and the third support plate 378 can be welded and hence connected to the floor 32. Thus, the outer perimeter of the first support plate 372, the second support plate 375, and the third support plate 378 can be free of weldment to facilitate metal-on-metal contact. As an alternative, if one, two, or all of the first support plate 372, the second support plate 375, and the third support plate 378 is/are without weld slots, then such one or more support plates can be welded around their respective perimeters.

Figure 13:
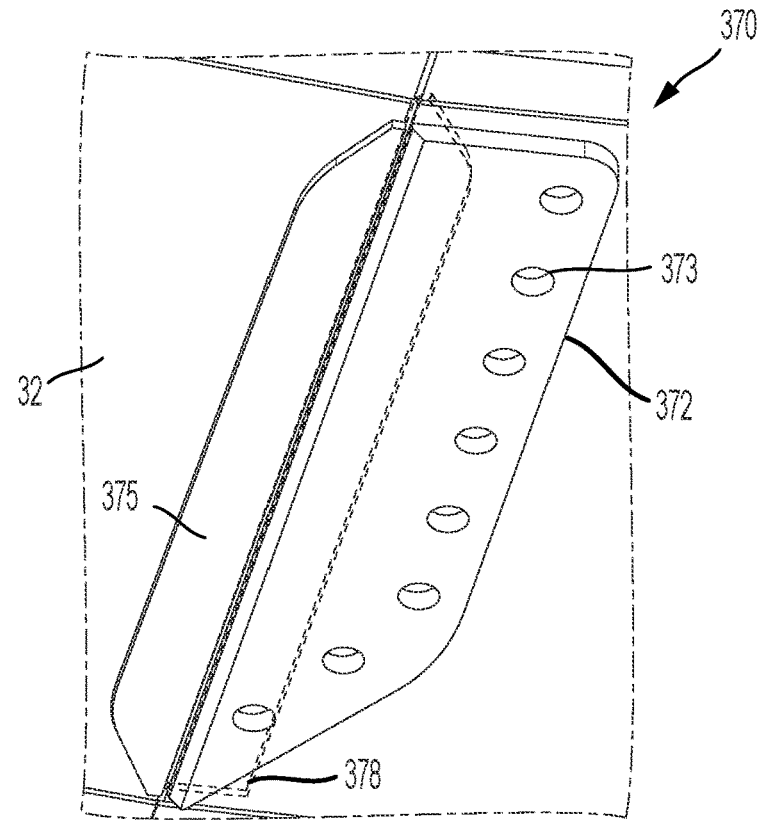
FIG. 13 shows a support structure on a dump body according to embodiments of the disclosed subject matter.

Each of the first support plate 372, the second support plate 375, and the third support plate 378 can have a length greater than a width. Moreover, the lengths of the first support plate 372, the second support plate 375, and the third support plate 378 may extend substantially along at least one interface between the portions of the floor 32 having different thicknesses, such as shown in FIG. 13 and FIG. 14. As particularly shown in FIG. 14, the width of the first support plate 372 can be greater than the width of the second support plate 375 and the third support plate 378, the latter two of which may be the same or substantially the same.

Figure 15:
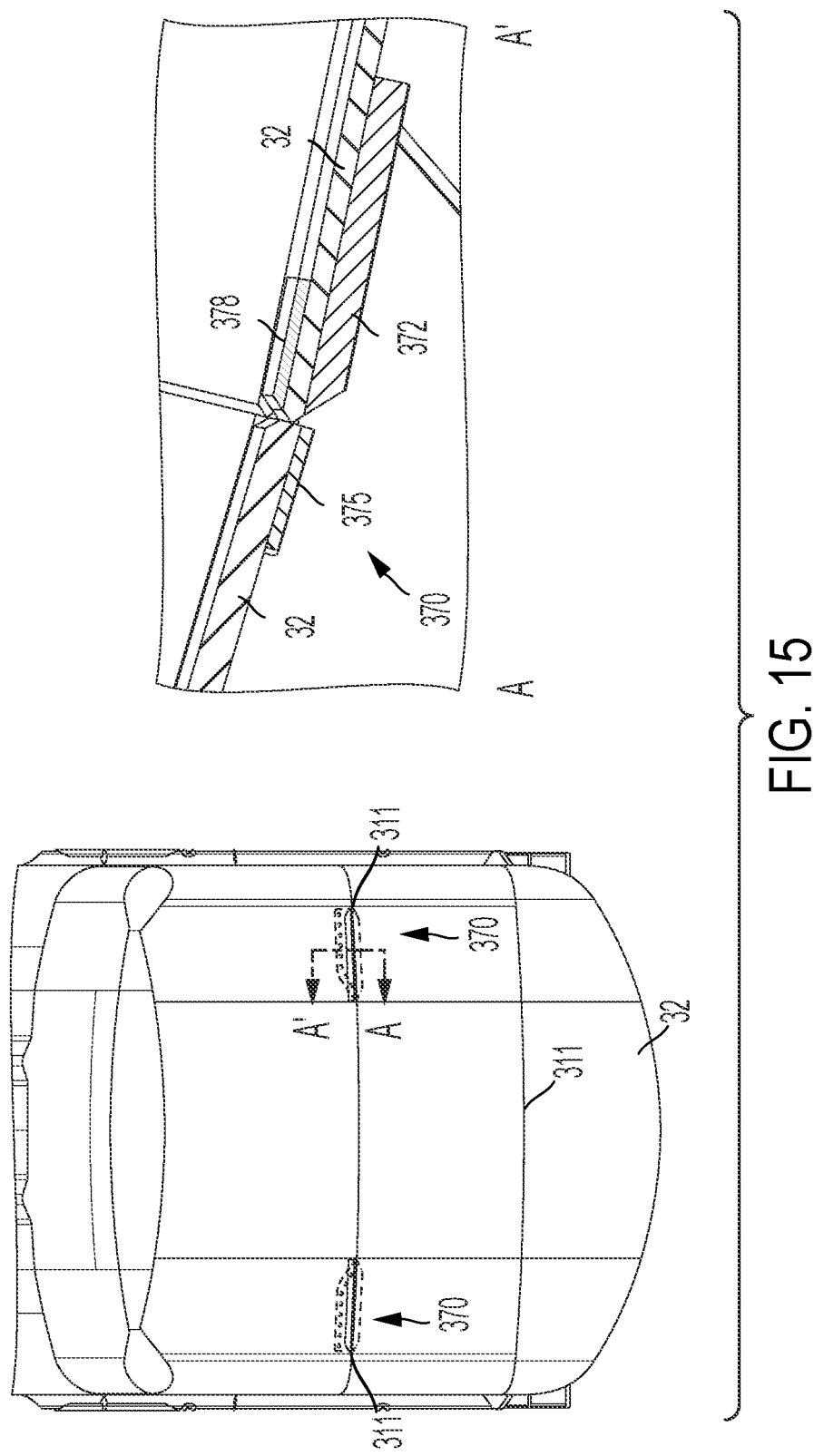
FIG. 15 shows a sectional view of the support structure of FIG. 13 according to the cross-section indicated in FIG. 14.

Turning to the cross-sectional view along A-A' in FIG. 15, the first support plate 372 can have a thickness greater than the second support plate 375 and the third support plate 378. Optionally, the second support plate 375 and the third support plate 378 can have the same or substantially the same thickness. According to one or more embodiments, the thickness of the first support plate 372 may be greater than or equal to the thickness of the portion (e.g., plate) of the floor 32 to which the second support plate 375 is fixedly coupled (e.g., welded). That is, the first support plate 372 may have a thickness that is greater than or equal to the thickness of the thickest portion (e.g., plate) of the floor 32.

INDUSTRIAL APPLICABILITY

As noted above, embodiments of the present disclosure relate to dump bodies for haul trucks, and systems, arrangements, assemblies, and methods thereof.

It may be desirable to reduce weight of the dump body to reduce weight of the haul truck and hence be able to accommodate greater payload, but such reduction in weight may need to take into consideration loads the dump body may need to withstand during operation of the truck. Embodiments of the disclosed subject matter can provide a dump body, such as dump body 30, with a bottom wall 31 having a convex shape in the transverse direction of the dump body 30 and/or the longitudinal direction of the dump body 30. The particular shape of the dump body 30 can be such the bottom wall 31 is self-supporting, in conjunction with the connections to the front wall 33, the side walls 34, and the canopy 40. In this regard, additional support structures, such as longitudinal support structures 50, can be provided only where needed to transfer loads from the dump body 30 to the frame 20, for instance. Additional support structures can be provided and may include the rails 344, which can be provided to run along a top perimeter of the side walls 34, and the transverse support structure 55, at the rear edge or tail 312 of the bottom wall 31, on an outer surface thereof. However, it may not be necessary to add additional steel plates to the bottom wall 31.

According to one or more embodiments, the bottom wall 31, particularly the floor 32 thereof, can be stepped in the longitudinal direction of the dump body 30. Such stepping can be such that a rear edge or tail of the bottom wall 31 or floor 32 is at a height greater than a height at which a front edge of the bottom wall 31 or floor 32 is to provide ground clearance for the bottom wall of the dump body 30. The floor 32 of the bottom wall 31, according to one or more embodiments, can have two or more distinct kick-ups 311 (FIG. 5, for instance, shows two distinct steps or kick-ups 311). Each kick-up 311 can increase the angle of the floor 32 by a predetermined amount. For instance, a first kick-up 311 may increase the angle of the floor 32 by an amount $\theta 1$ and a second kick-up 311 may increase the angle of the floor 32 by an amount $\theta 2$. Providing multiple kick-ups 311 instead of a single kick-up can increase ground clearance when the dump body 30 is in a fully raised position, provide stiffness for the rear portion 35 of the dump body 30, and reduce the abruptness in change in angle of the floor 32, the latter of which may minimize or mitigate wear rate of the bottom wall 31 because the change in material flow is more gradual (as compared to a single kick-up with a relatively drastic angle change).

Additionally, embodiments of the disclosed subject matter can have a bottom wall, such as bottom wall 31, with portions having different thicknesses. That is, the bottom wall 31, which may be thicker than the side walls 34 and/or the front wall 33, may have sections with different thicknesses. The thickness of the bottom wall 31 can be provided according to an optimized pattern based on abrasive and/or impact wear data specific to the worksite or more general wear data. As an example, the thickness of the bottom wall 31 may be according to a bell-shaped pattern, where the bottom wall 31 is thickest according to the bell shape.

According to one or more embodiments, a middle portion of the bottom wall 31 may be the thickest portion of the bottom wall 31, and may be defined along at least a longitudinal center line of the bottom wall 31 and optionally at a transverse center line of the bottom wall 31. The bottom wall 31 may thus transition from thickest to medium or moderate thickness. Optionally, depending upon the location, the bottom wall 31 may transition from moderate thickness to thinnest, or the moderate thickness may form edge portions of the bottom wall 31. The different thicknesses of the bottom wall 31 can be implemented in the body of the bottom wall 31 itself, rather than adding doublers to the bottom wall.

It may also be desirable to size side walls of a dump body to accommodate a particular payload volume to be in compliance with GVW tolerance of the truck, without having to redesign the entire dump body for each size of payload and without having to add side boards, which may add weight to a dump body and may be prone to failure because they may not be fully tied-in to the overall structure of the dump body.

According to embodiments of the disclosed subject matter, a shell for the dump body 30 can be comprised of bottom wall 31, front wall 33, and canopy 40 adapted to accommodate, as part of the dump body 30, multiple different side walls, such as side walls 34, to form the dump body 30. For instance, as shown in FIG. 6, the bottom wall 31, the canopy 40, and the front wall 33 can be characterized as forming a modular interface by which different side walls, such as side walls 34, can be implemented as part of the dump body 30. The modular interface formed by the bottom wall 31, the canopy 40, and the front wall 33 can be so multiple different side walls can be configured such that minimal components are tied to the bottom wall 31, the canopy 40, and the front wall 33, which can mean that different pairs of side walls can be more readily swapped. That is, embodiments of the disclosed subject matter can provide a specific interface between one or more pairs of side walls, such as side walls 34, with minimized number of joints.

Figure 17B:
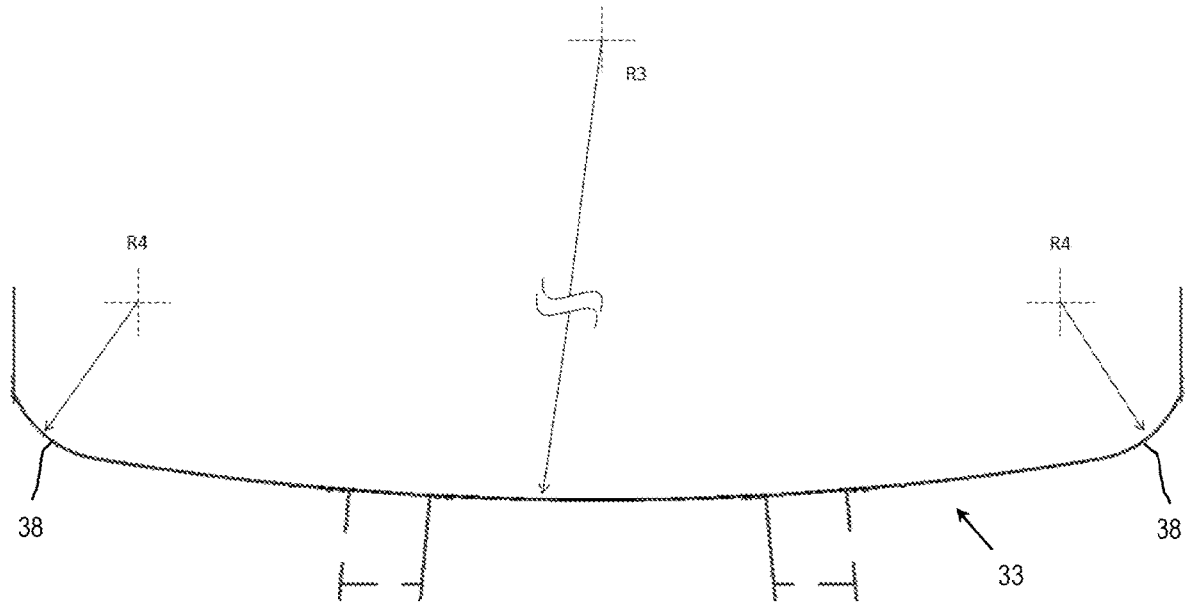
FIG. 17B is a sectional view of the front wall of the dump body associated with line 17B-17B' in FIG. 6.

For instance, the forward support structure 340 of the side wall 34 can extend only part way along the length of the canopy 40, and the rail 344, which may extend at a top edge of the side wall 34, can be provided only on the side wall 34, to provide stiffness to the overall dump body 30 when the side walls 34 are installed, and to protect the side wall 34 from falling debris. Hence, the interface with the side wall 34 can involve only the bottom edge of the side wall 34 coupled (e.g., welded) to the bottom wall 31, particularly the transition section 37, and optionally a corner of the front wall 33, depending upon whether the vertical transition section 38 is considered part of the front wall 33, and the forward support structure 340 coupled (e.g., welded) to the canopy 40 and the vertical transition section 38. Referring to FIG. 17B, which shows a cross-sectional view of the front wall 33 based on line 17B-17B' in FIG. 6, the front wall 33 may have a curvature having a radius of at or about R3 and the vertical transition sections 38 may have a curvature having a radius of at or about R4, wherein R3 can be different than R4 in value. As non-limiting examples, R3 may be 20,000+/−25 mm and/or R4 may be 680+/−25 mm.

As shown in FIG. 8, the first body attachment 350 can have the transverse or attachment bracket plate 352, one or more longitudinal plates 354, and the base or board plate 356. The transverse plate 352 can have a length greater than a width, and may be in the form of a polygon, for instance, with at least two parallel edges. Optionally, the transverse plate 352 may have a width that tapers along a length direction of the transverse plate 352, such as shown in FIG. 9 and FIG. 10. According to one or more embodiments, the transverse plate 352 can have a plurality of fastener slots 353.

Each of the one or more longitudinal plates 354 can have a body with a slot 355. The slot 355 can be sized to receive respective a portion of the transverse plate 352, such as shown in FIGS. 8-10. Optionally, in the case of multiple longitudinal plates 354, some, none, or all of the longitudinal plates 354 may run or extend parallel to each other.

The base plate 356 can have one or more weld slots 357. FIG. 8, for instance, shows base plate 356 having four weld slots 357. Optionally, the base plate 356 can have rounded corners, such as shown in FIG. 8, and may have a length greater than a length of the longitudinal plates 354, but less than the length of the transverse plate 352.

The transverse plate 352 can be provided in the slots 355 of the longitudinal plates 354 and attached (e.g., welded) to the longitudinal plates 354 at the slots 355. Optionally, such attachment may be done prior to the longitudinal plates 354 being fixed (e.g., welded) to the base plate 356. In any event, each of the longitudinal plates 354 can be, at a side thereof (e.g., a base thereof) opposite the slot 355, attached (e.g., welded) to the base plate 356. Optionally, such attachment may be done prior to the base plate 356 being fixed (e.g., welded) to the floor 32 of the bottom wall 31.

The base plate 356 can be fixed (e.g., welded) to the floor 32 of the bottom wall 31. In particular, the base plate 356 can be fixed (e.g., welded) to the floor 32 such that the outer perimeter of the base plate 356 is not welded to the floor 32 and around the weld slots 357 is the only portions where the base plate 356 is fixed (e.g., welded) to the floor 32. Hence, the outer perimeter of the base plate 356 may be in contact with the floor 32, but can be free of weldment, thereby making metal-on-metal (e.g., steel-on-steel) contact with the floor 32. In this regard, typically, the yield strength and fatigue life of welds are lower than its parent steel materials. By having the outer perimeter of the base plate 356 free of weldment, the base plate 356 can be allowed to make metal-on-metal (e.g., steel-on-steel) contact with the floor 32 of the bottom wall 31 along the outer perimeter of the base plate 356, which can achieve stress transfer through metal-on-metal (e.g., steel-on-steel) contact, rather than through the weld. This can help achieve desired fatigue life by taking advantage of the predominantly compressive manner of loads of the dump body 30.

As noted above, each of the first body attachments 350 can be fixed (e.g., welded) to the floor 32 of the bottom wall 31 such that the base plate 356 is in direct contact with the floor 32 at least at the outer perimeter of the base plate 356 and the base plate 356 is fixed (e.g., welded) only at the weld slots 357. When fixedly attached to the floor 32, the transverse plate 352 can be oriented transverse, substantially transverse, or generally transverse to a longitudinal or length direction of the dump body 30. Also, when fixedly attached to the floor 32, the longitudinal plates 354 can be oriented along, substantially along, or generally along the longitudinal or length direction of the dump body 30. The configuration of the first body attachment 350 can allow the transverse plate 352 to move along with deformation of the dump body 30 caused by compressive loads, rather than moving against the deformation.

The second body attachment 360, such as shown in FIG. 11, may be referred to as a rock ejector attachment, and can include a base plate 362, a pair of longitudinal plates 365, and one or more transverse plates 368, 369. The longitudinal plates 365, which may have a length greater than a length of the base plate 362, can extend from the base plate 362. According to one or more embodiments, the longitudinal plates 365 can be parallel to each other, for instance. Optionally, each of the longitudinal plates 365 can have at least one cutout 366. The at least one transverse plate 368 may be provided between the longitudinal plates 365, such as shown in FIG. 11. The transverse plate 369 may span the longitudinal plates 365, and may be provided in respective slots 367 of the longitudinal plates 365. Optionally, one or more edges of the transverse plate 369 may extend from the sides and/or edges of the longitudinal plates 365.

The base plate 362 can have one or more first weld slots 363. FIG. 11, for instance, shows base plate 362 having eight first weld slots 363, four on each side of the pair of longitudinal plates 365. According to one or more embodiments, the base plate 362 can have one or more second weld slots 364, which may be elongate, provided between the longitudinal plates 365. Optionally, the base plate 362 can have rounded corners, such as shown in FIG. 11, and may have a length greater than a width.

Each of the longitudinal plates 365 can be, at a side thereof (e.g., a base thereof) opposite the slot 367, attached (e.g., welded) to the base plate 362. Optionally, such attachment may be done prior to the base plate 362 being fixed (e.g., welded) to the floor 32 of the bottom wall 31. The base plate 362 can be fixed (e.g., welded) to the floor 32 of the bottom wall 31. In particular, the base plate 362 can be fixed (e.g., welded) to the floor 32 such that the outer perimeter of the base plate 362 is not welded to the floor 32 and, instead, is welded around the first weld slots 363. Hence, the outer perimeter of the base plate 362 may be in contact with the floor 32, but can be free of weldment, thereby making metal-on-metal (e.g., steel-on-steel) contact with the floor 32. Optionally, the base plate 362 may also be fixed (e.g., welded) to the floor 32 around the second weld slots 364. When fixedly attached to the floor 32, the longitudinal plates 365 can be oriented along, substantially along, or generally along the longitudinal or length direction of the dump body 30.

As noted above, typically, the yield strength and fatigue life of welds are lower than its parent steel materials. By having the outer perimeter of the base plate 362 free of weldment, the base plate 362 can be allowed to make metal-on-metal (e.g., steel-on-steel) contact with the floor 32 of the bottom wall 31 along the outer perimeter of the base plate 362, which can achieve stress transfer through metal-on-metal (e.g., steel-on-steel) contact, rather than through the weld. This can help achieve desired fatigue life by taking advantage of the predominantly compressive manner of loads of the dump body 30.

According to one or more embodiments, the bottom wall 31, for instance, the floor 32 thereof, can have one or more support structures 370, such as shown in FIG. 12 and FIG. 14 (FIG. 12 and FIG. 14 show a pair of support structures 370). The support structure 370 can be provided at a union of a moderate thickness portion (e.g., plate) of the floor 32 and a thickest portion of the floor 32.

The support structure 370 can include a set of one or more support plates, each of which may be referred to as doublers, coupled (e.g., welded) to the floor 32 of the bottom wall 31. For example, the support structure 370 can include a first support plate 372, a second support plate 375, and a third support plate 378. As shown in FIG. 12 and FIG. 14, for instance, the first support plate 372 and the second support plate 375 can be coupled (e.g., welded) to a bottom side of the floor 32, and the third support plate 378 can be coupled (e.g., welded) to a top side of the floor 32 opposite the bottom side. Optionally, the first support plate 372 can have a plurality of weld slots 373 and the second support plate 375 and the third support plate 378 may be free of weld slots.

Each of the first support plate 372, the second support plate 375, and the third support plate 378 can have a length greater than a width. Moreover, the lengths of the first support plate 372, the second support plate 375, and the third support plate 378 may extend substantially along at least one interface between the portions (e.g., plates) of the floor 32 having different thicknesses, such as shown in FIG. 13 and FIG. 14. As particularly shown in FIG. 14, the width of the first support plate 372 can be greater than the width of the second support plate 375 and the third support plate 378, the latter two of which may be the same or substantially the same.

According to one or more embodiments, the thickness of the first support plate 372 may be greater than or equal to thickness of the portion (e.g., plate) of the floor 32 to which the second support plate 375 is fixedly coupled (e.g., welded). That is, the first support plate 372 may have a thickness that is greater than or equal to the thickness of the thickest portion (e.g., plate) of the floor 32. Deformation at the union of the floor plates can be caused by lack of transverse structure near this location, change in floor thickness, and change in slope angle due to kick-up. The foregoing configuration can shift such deformation of the floor 32 from the union of the adjacent, different-width portions (e.g., plates) of the floor 32 to the outer perimeter of the first support plate 372. As shown in the cross-sectional view along A-A' in FIG. 15, the first support plate 372 can have a thickness greater than the thickness(es) of the second support plate 375 and the third support plate 378. Such configuration can help to decouple deformation caused by the first support plate 372 on the respective portions (e.g., plates) of the floor 32 associated with the second support plate 375 and the third support plate 378. Optionally, the second support plate 375 and the third support plate 378 can have the same or substantially the same thickness.

Figure 16:
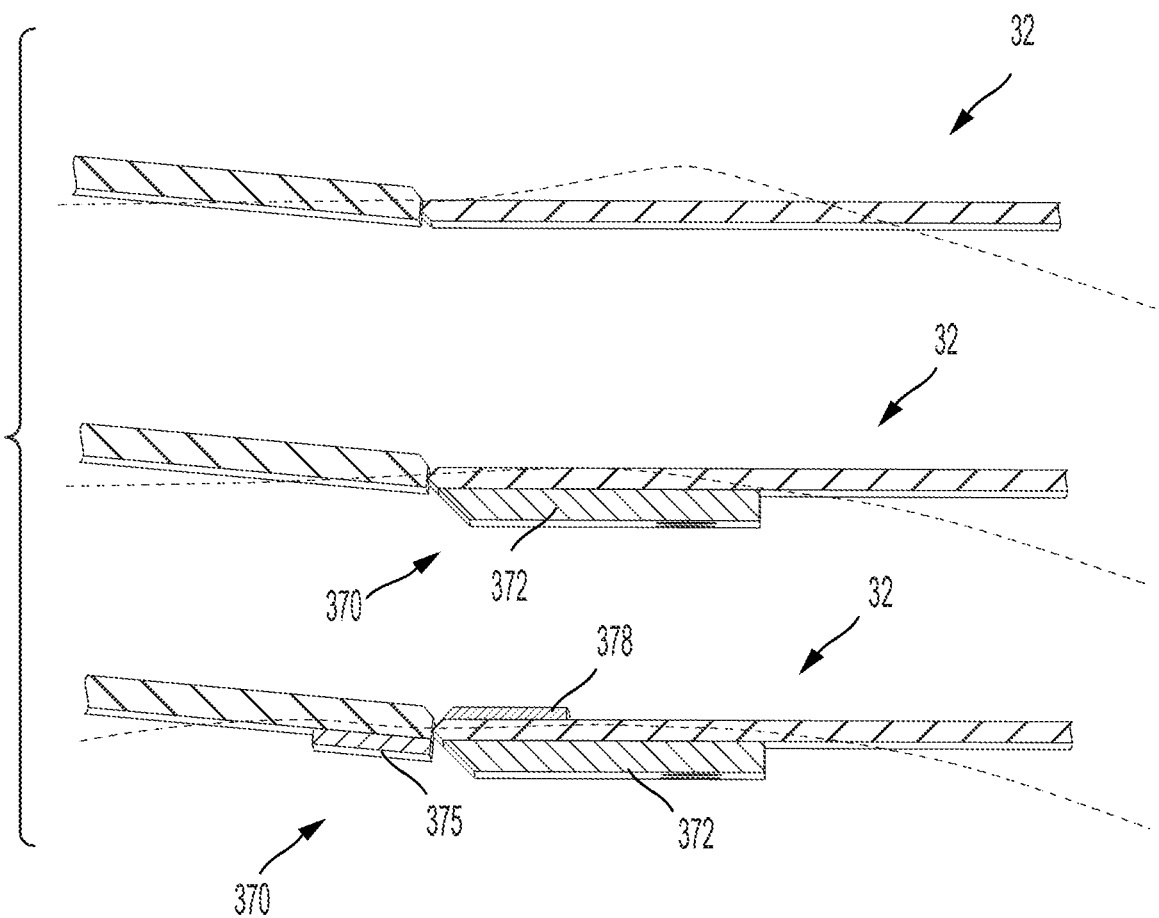
FIG. 16 shows sectional views of dump bodies according to embodiments of the disclosed subject matter.

FIG. 16 shows sectional views of floors 32 of dump bodies 30 according to embodiments of the disclosed subject matter. The dashed lines represent exaggerated deformation that the floors 32 may experience. Notably, the top image of FIG. 16 does not include any of the first support plate 372, the second support plate 375, or the third support plate 378; the middle image includes only the first support plate 372 (and not either the second support plate 375 or the third support plate 378) for the support structure 370; and the bottom image includes all of the first support plate 372, the second support plate 375, and the third support plate 378 for the support structure 370. Also, in the bottom image, the second support plate 375 and the third support plate 378 can be different thicknesses, for instance, the second support plate 375 greater in thickness than the third support plate 378 (though as noted above, the second support plate 375 and the third support plate 378 may be the same thickness or substantially the same thickness).

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An off-highway rear had truck comprising:
a frame; and
a modular dump body configured to be operatively coupled to the frame, the modular dump body including:
a front wall,
a canopy extending forward from the front wall,
a bottom wall having a convex shape in each of a transverse direction and a longitudinal direction of the modular dump body, and
a pair of opposing side walls spaced from each other in the transverse direction of the modular dump body and coupled to each of the front wall, the canopy, and the bottom wall,
wherein the front wall, the canopy, and the bottom wall form a modular interface configured to interface separately with a plurality of different opposing side wall pairs having differing heights, including said pair of opposing side walls,
wherein the bottom wall is stepped in the longitudinal direction of the modular dump body such that a rear edge of the bottom wall is at a height greater than a height at which a front edge of the bottom wall is to provide ground clearance for the bottom wall of the modular dump body when the modular dump body is in a fully raised position,
wherein a middle portion of the bottom wall forms a thickest portion of the bottom wall,
wherein the bottom wall is stepped according to at least two kick-ups,
wherein from the front edge of the front wall to a first of the at least two kick-ups is a first length,
wherein from the first kick-up to a second of the at least two kick-ups is a second length, the first length being greater than the second length, and
wherein from the second kick-up to the rear edge of the bottom wall is a third length, the second length being greater than the third length.

2. The off-highway rear haul truck according to claim 1, wherein the at least two kick-ups increase an angle of the bottom wall by four to five degrees each.

3. The off-highway rear haul truck according to claim 1, wherein the at least two kick-ups change incline of the bottom wall from twelve degrees to either twenty degrees or twenty-two degrees.

4. The off-highway rear haul track according to claim 1, wherein the bottom wall includes opposing transition sections that ran in the longitudinal direction of the modular dump body,
wherein each of the transition sections has a first edge coupled to a respective one of the side walls and a second edge coupled to a floor of the bottom wall, and
wherein the transition sections are convex from inside the modular dump body.

5. The off-highway rear haul truck according to claim 1, wherein each of the side walls includes a top rail support structure that runs along a top edge of the side wall, and
wherein no part of the top rail is connected to the canopy.

6. The off-highway rear haul truck according to claim 1, wherein each of the side walls includes a forward support structure configured as a projection to interface with the canopy, the forward support structure extending only partway along a length of the canopy in the longitudinal direction of the modular dump body and interfacing with an edge support structure of the canopy.

7. The off-highway rear haul track according to claim 1,
wherein the bottom wall has sections of differing thicknesses, and
wherein thickest sections of the bottom wall are defined according to a bell-shaped pattern in an overhead plan view of the modular dump body, the bell-shaped pattern extending from the front edge of the bottom wall to the rear edge of the bottom wall.

8. The off-highway rear haul truck according to claim 1, further comprising at least one support structure welded to a floor of the bottom wall,
wherein the floor of the bottom wall is comprised of a plurality of different plates having different thicknesses,
wherein the at least one support structure is provided at a union of one of the plates having a greatest thickness and one of the plates having a thickness between the greatest thickness and a minimum thickness of the plates,
wherein the at least one support structure includes at least a first support plate,
wherein the first support plate is welded to a bottom side of the floor, to the plate having the thickness between the greatest thickness and the minimum thickness, and
wherein a thickness of the first support plate is greater than or equal to a thickness of the plate having the greatest thickness.

9. A dump body for a haul truck comprising:
a shell including a front wall, a canopy, and a bottom wall; and
a pair of side walls spaced from each other in a transverse direction of the dump body and coupled to the shell, at least the side walls, the front wall, and the bottom wall defining a haul volume of the haul truck,
wherein the bottom wall has a convex shape in a longitudinal direction of the dump body,
wherein the shell forms a modular interface configured to interface separately with a plurality of different side wall pairs having differing heights, including said pair of side walls, and
wherein the bottom wall includes transition sections that ran in the longitudinal direction of the dump body, each of the transition sections has a first edge coupled to a respective one of the side walls and a second edge coupled to a floor of the bottom wall, and each of the transition sections is convex from inside the haul volume of the dump body.

10. The dump body according to claim 9, wherein the sidewalls are directly coupled to each of the front wall, the canopy, and the bottom wall of the shell.

11. The dump body according to claim 9,
wherein the bottom wall is stepped according to at least two kick-ups to increase incline of the bottom wall in a direction toward the rear edge of the bottom wall,
wherein from a front edge of the front wall to a first of the at least two kick-ups is a first length,
wherein from the first kick-up to a second of the at least two kick-ups is a second length, the first length being greater than the second length, and
wherein from the second kick-up to the rear edge of the bottom wall is a third length, the second length being greater than the third length.

12. The dump body according to claim 9, wherein each of the side walls includes a forward support structure configured to interface with the canopy, the forward support structure extending only partway along a length of the canopy in the longitudinal direction of the dump body and interfacing with an edge support structure of the canopy.

13. The dump body according to claim 9,
wherein the bottom wall has sections of differing thicknesses, and
wherein a first section of the bottom wall has a first thickness of a factor of 1, a second section of the bottom wall has a second thickness of 3/4 the first section, and a third section of the bottom wall has a third thickness of 1/2 the first section.

14. The dump body according to claim 13, wherein thickest sections of the bottom wall are defined according to a bell-shaped pattern, the bell-shaped pattern extending from the front edge of the bottom wall to the rear edge of the bottom wall, and the bell-shaped pattern includes an entirely of the rear edge of the bottom wall.

15. A dump body comprising:
a front wall;
a canopy extending from the front wall in a first direction; and
a bottom wall, extending from the front wall in a second direction different from the first direction,
wherein the front wall, the canopy, and the bottom wall form an interface configured to receive a plurality of different pairs of side walls with different heights,
wherein the bottom wall has a convex shape in a transverse direction of the dump body,
wherein the bottom wall includes transition sections that run in a longitudinal direction of the dump body, each of the transition sections being coupled to a floor of the bottom wall, and each of the transition sections is convex, and
wherein a middle portion of the floor of the bottom wall forms a thickest portion of the bottom wall.

16. The dump body according to claim 15,
wherein the floor of the bottom wall is stepped in the longitudinal direction of the dump body according to at least two kick-ups that increase an angle of incline of the floor of the bottom wall,
wherein from a front edge of the front wall to a first of the at least two kick-ups is a first length,
wherein from the first kick-up to a second of the at least two kick-ups is a second length, the first length being greater than the second length, and
wherein from the second kick-up to the rear edge of the bottom wall is a third length, the second length being greater than the third length.

17. The dump body according to claim 15, further comprising one pair of side walls of the plurality of different pairs of the side walls,
wherein the side walls are directly coupled to respective ones of the transition sections of the bottom wall and the front wall.

18. The dump body according to claim 17, wherein each of the side walls includes a forward support structure configured to interface with the canopy, the forward support structure extending only partway along a length of the canopy in the longitudinal direction of the dump body and interfacing with an edge support structure of the canopy.

19. The dump body according to claim 15,
wherein the bottom wall has sections of differing thicknesses, and
wherein a first pair of body attachments and/or a second pair of body attachments is/are affixed to a bottom side of the floor of the bottom wall, each body attachment of the first pair of body attachments being a mudflap attachment, and each body attachment of the second pair of body attachments being a rock ejector attachment.

* * * * *